United States Patent
Igari

(10) Patent No.: US 11,230,272 B2
(45) Date of Patent: Jan. 25, 2022

(54) WHEELIE CONTROLLER AND CONTROL METHOD THEREOF

(71) Applicant: Robert Bosch GmbH, Stuttgart (DE)

(72) Inventor: Yoshihide Igari, Kanagawa (JP)

(73) Assignee: Robert Bosch GmbH, Stuttgart (DE)

( * ) Notice: Subject to any disclaimer, the term of this patent is extended or adjusted under 35 U.S.C. 154(b) by 207 days.

(21) Appl. No.: 16/065,859

(22) PCT Filed: Dec. 5, 2016

(86) PCT No.: PCT/IB2016/057343
§ 371 (c)(1),
(2) Date: Jun. 25, 2018

(87) PCT Pub. No.: WO2017/109615
PCT Pub. Date: Jun. 29, 2017

(65) Prior Publication Data
US 2018/0370506 A1    Dec. 27, 2018

(30) Foreign Application Priority Data
Dec. 24, 2015 (JP) .............................. JP2015-252601

(51) Int. Cl.
*B60T 8/17* (2006.01)
*B60W 40/11* (2012.01)
(Continued)

(52) U.S. Cl.
CPC .............. *B60T 8/1706* (2013.01); *B60T 8/17* (2013.01); *B60T 8/1755* (2013.01); *B60W 10/04* (2013.01);
(Continued)

(58) Field of Classification Search
CPC combination set(s) only.
See application file for complete search history.

(56) References Cited

U.S. PATENT DOCUMENTS

| 4,989,922 A * | 2/1991 | Pickenhahn | .......... B60T 8/1706 |
| | | | 180/219 |
| 6,904,350 B2 * | 6/2005 | Lu | ...................... B60G 17/0162 |
| | | | 701/38 |

(Continued)

FOREIGN PATENT DOCUMENTS

| DE | 102005028995 A1 * | 1/2007 |
| DE | 102005028995 A1 | 1/2007 |

(Continued)

OTHER PUBLICATIONS

International Search Report and Written Opinion for Application No. PCT/IB2016/057343 dated Feb. 17, 2017 (8 pages).

*Primary Examiner* — Redhwan K Mawari
(74) *Attorney, Agent, or Firm* — Michael Best & Friedrich LLP

(57) ABSTRACT

A wheelie controller and a control method thereof or preventing a reduction of acceleration that is more than necessary and reducing a shock during a contact of a front wheel with the ground when a wheelie state is terminated. The wheelie controller for controlling a wheelie of a vehicle body computes a target trajectory, which is a target of a parameter and is used to control the wheelie state of the vehicle body, in accordance with the parameter that is related to pitch of the vehicle body and controls an increase/reduction of the pitch of the vehicle body so as to bring the parameter close to the target trajectory.

20 Claims, 4 Drawing Sheets

(51) Int. Cl.

| | |
|---|---|
| *B60T 8/1755* | (2006.01) |
| *B60W 10/06* | (2006.01) |
| *B60W 10/184* | (2012.01) |
| *F02D 41/10* | (2006.01) |
| *F02B 61/02* | (2006.01) |
| *F02D 29/02* | (2006.01) |
| *B60W 10/18* | (2012.01) |
| *B60W 30/02* | (2012.01) |
| *B60W 10/04* | (2006.01) |

(52) U.S. Cl.
CPC .......... *B60W 10/06* (2013.01); *B60W 10/18* (2013.01); *B60W 10/184* (2013.01); *B60W 30/02* (2013.01); *B60W 40/11* (2013.01); *F02B 61/02* (2013.01); *F02D 29/02* (2013.01); *F02D 41/10* (2013.01); *B60T 2230/03* (2013.01); *B60T 2240/06* (2013.01); *F02D 2200/1002* (2013.01)

(56) References Cited

U.S. PATENT DOCUMENTS

| | | | | |
|---|---|---|---|---|
| 10,245,952 | B1* | 4/2019 | Patterson | B62M 23/00 |
| 2002/0039951 | A1* | 4/2002 | Hasegawa | B60R 21/0132 |
| | | | | 477/183 |
| 2002/0121394 | A1* | 9/2002 | Kamen | A61G 5/061 |
| | | | | 180/41 |
| 2007/0298678 | A1* | 12/2007 | Gotou | A63H 17/21 |
| | | | | 446/440 |
| 2008/0230285 | A1* | 9/2008 | Bewley | B62D 37/00 |
| | | | | 180/8.4 |
| 2008/0290618 | A1* | 11/2008 | Yanaka | B60G 3/01 |
| | | | | 280/6.15 |
| 2010/0096833 | A1* | 4/2010 | Gray | B62H 7/00 |
| | | | | 280/293 |
| 2012/0078470 | A1* | 3/2012 | Hirao | B60G 17/08 |
| | | | | 701/38 |
| 2013/0261914 | A1* | 10/2013 | Ingram | B60W 30/143 |
| | | | | 701/70 |
| 2014/0277993 | A1* | 9/2014 | Hookway | B60W 40/10 |
| | | | | 701/101 |
| 2015/0182393 | A1* | 7/2015 | Shirato | A61G 5/1089 |
| | | | | 180/19.1 |
| 2016/0144854 | A1* | 5/2016 | Watanabe | B60T 8/1755 |
| | | | | 477/185 |
| 2017/0101008 | A1* | 4/2017 | Hirokami | B60K 28/10 |
| 2017/0101009 | A1* | 4/2017 | Hirokami | B60K 28/10 |
| 2017/0101945 | A1* | 4/2017 | Hirokami | F02D 41/1497 |
| 2018/0370506 | A1* | 12/2018 | Igari | B60W 40/11 |

FOREIGN PATENT DOCUMENTS

| | | |
|---|---|---|
| JP | 2007245993 A | 9/2007 |
| JP | 2010229912 A | 10/2010 |
| JP | 2011137416 A | 7/2011 |
| JP | 2013209047 A | 10/2013 |
| JP | WO-2014167983 * | 10/2014 |

* cited by examiner

[Fig 1]
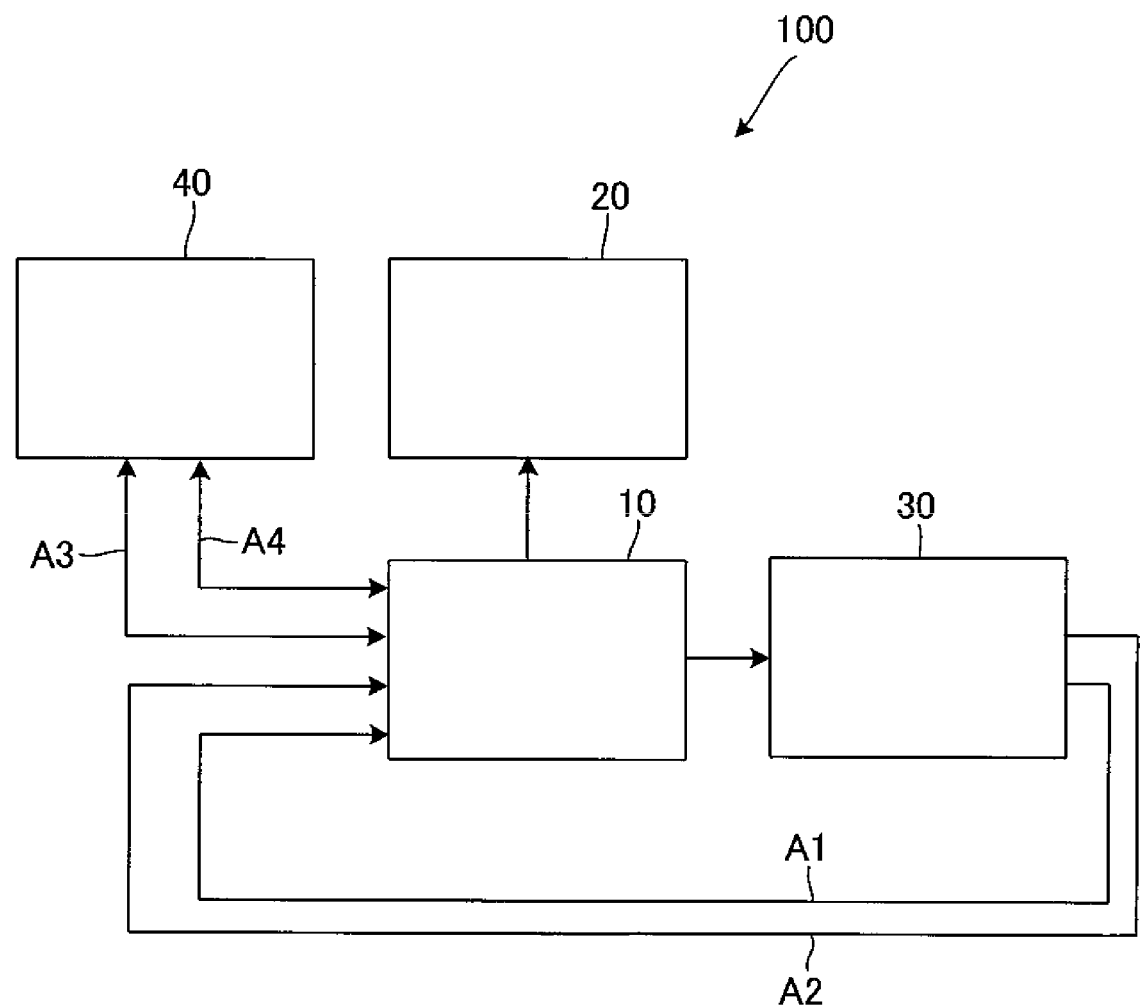

[Fig2]
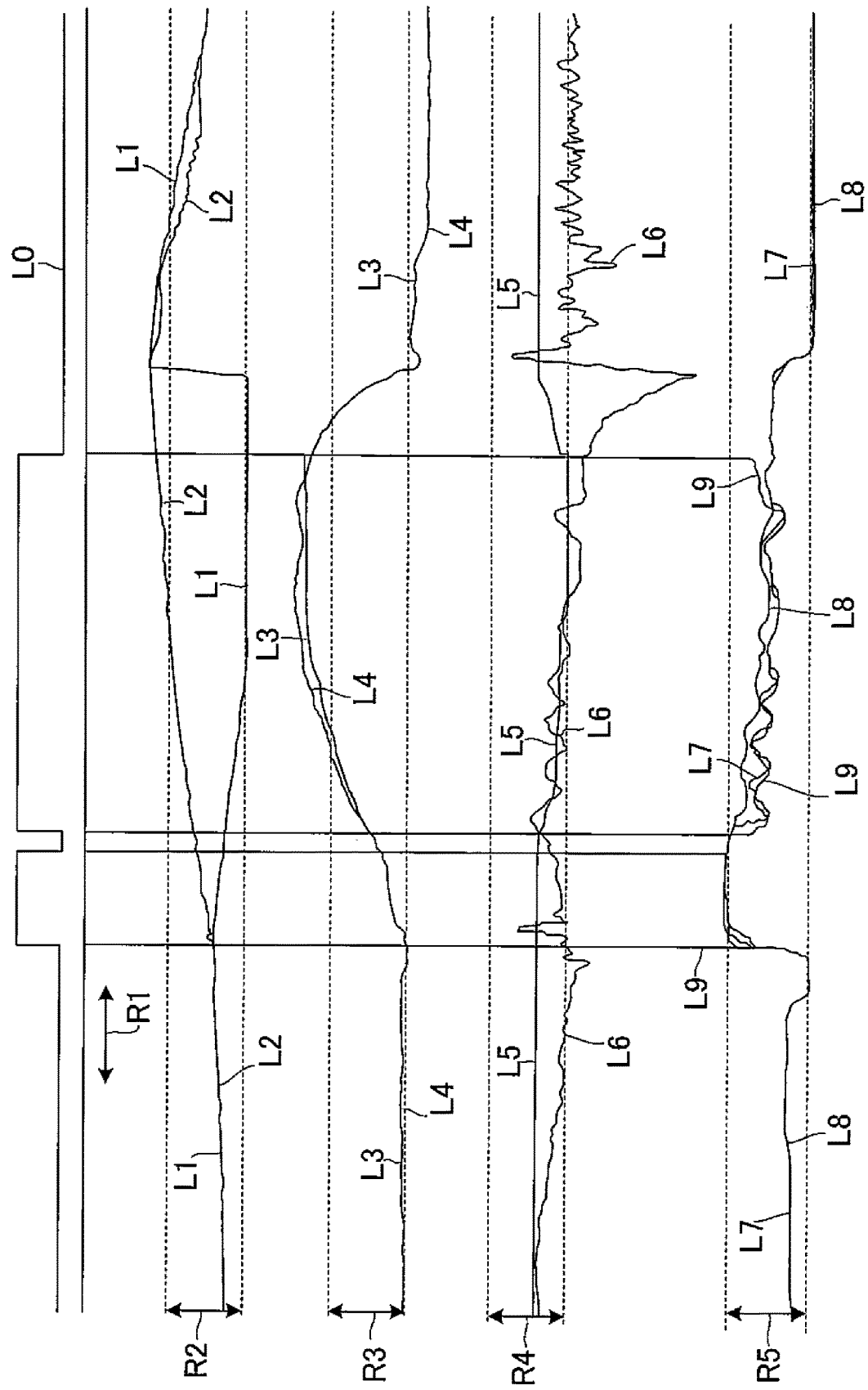

[Fig3]
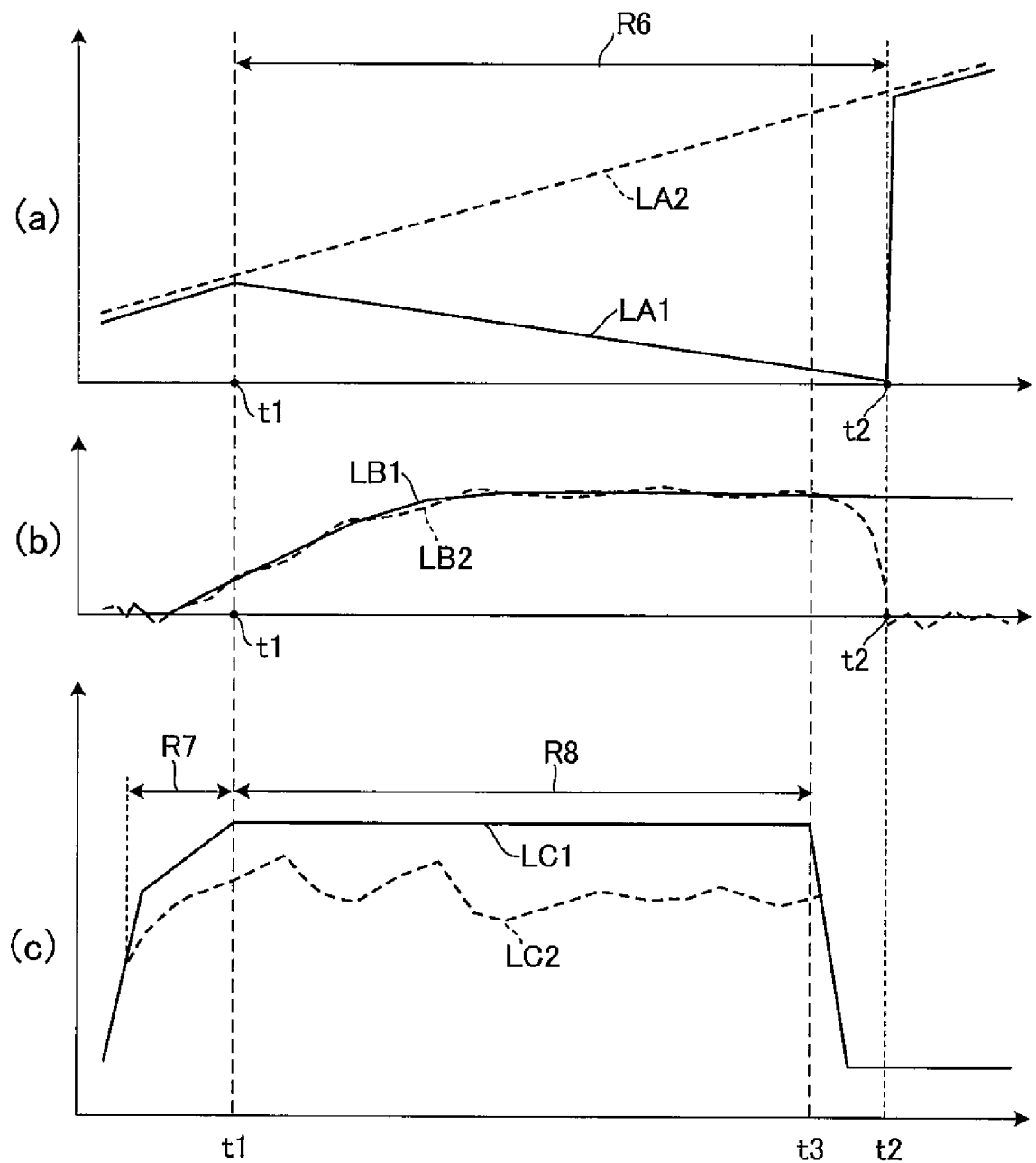

[Fig4]
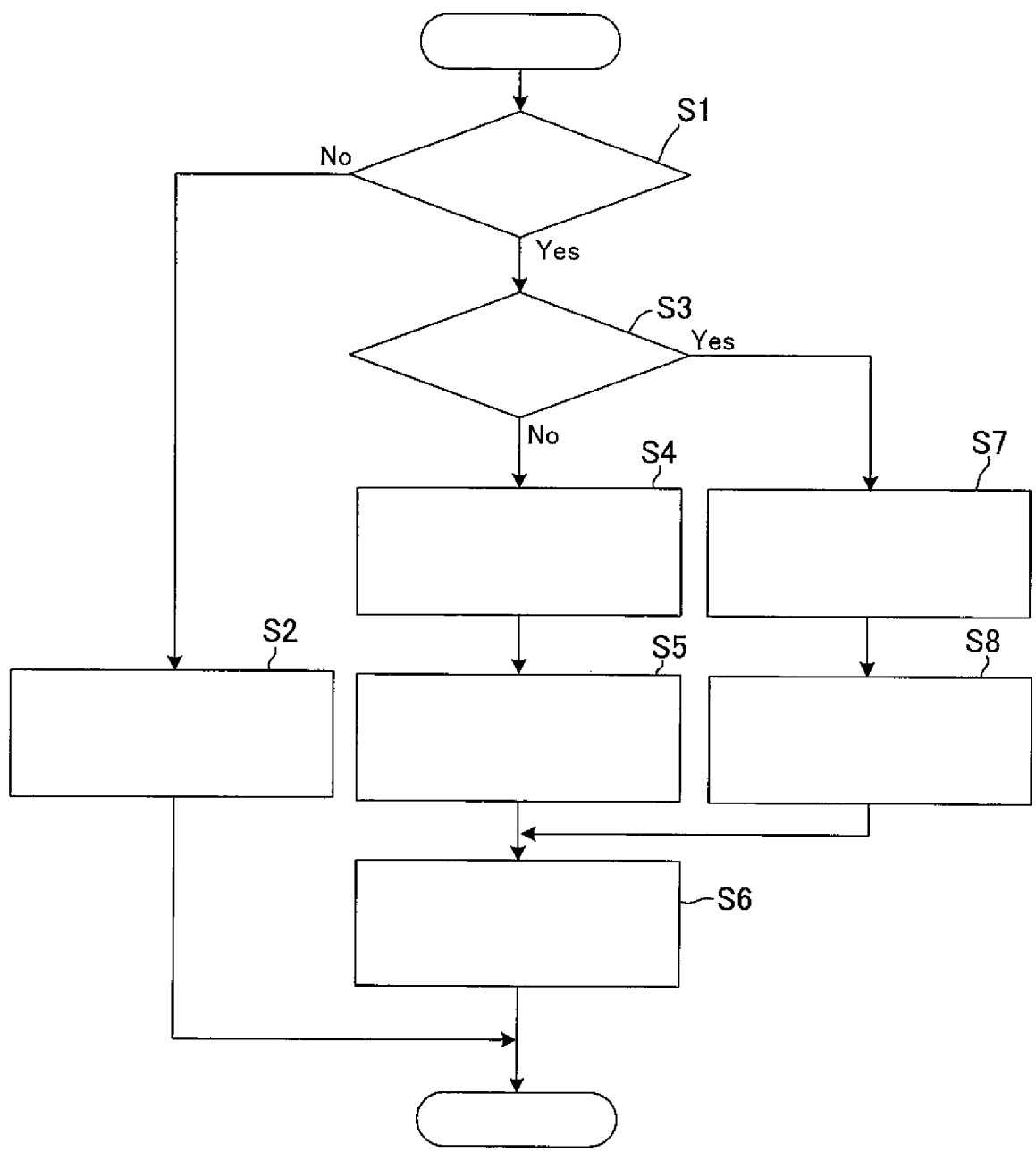

WHEELIE CONTROLLER AND CONTROL METHOD THEREOF

BACKGROUND OF THE INVENTION

The invention relates to a wheelie controller for a motorcycle and a control method thereof.

A two-wheeled vehicle has a lighter weight than a four-wheeled vehicle. While a general four-wheeled vehicle weighs approximately 1,000 kg, the two-wheeled vehicle only weighs approximately one-fifth thereof, that is, 200 kg. The two-wheeled vehicle also has a characteristic of being brought into a wheelie state, in which a front wheel comes off the ground, during rapid acceleration due to a rear-wheel drive layout thereof. Because the wheelie is an unstable vehicle body behavior, the vehicle body possibly falls down. In addition, the excess wheelie degrades accelerating performance of the vehicle body. For this reason, a controller for suppressing the wheelie by electronic control has been suggested and has actually been available as a product on the market. This type of the controller achieves suppression of the wheelie by detecting the wheelie and reducing engine output torque to make it lower than output desired by a rider (for example, see PTL 1 and PTL 2).

CITATION LIST

Patent Literature

PTL 1: JP-A-2011-137416
PTL 2: JP-A-2010-229912

SUMMARY OF INVENTION

The controller by the above conventional technique executes control for reducing the engine output torque in accordance with a pitch angle of the vehicle body after detecting the wheelie, and a purpose of the control is to promptly terminate the wheelie state. Meanwhile, an experienced rider not only senses the pitch angle of the vehicle body but also senses a pitch angular speed to control the vehicle body. For example, in the case where the pitch angular speed is high, the experienced rider performs an operation to reduce the engine output even when the pitch angle of the vehicle body is still small. It is because the wheelie with a large pitch angle possibly occurs at a next moment. On the other hand, even in the case where the pitch angle is large, the experienced rider performs an operation to increase the engine output torque when the pitch angular speed is changed in a direction of a reduction. Through these operations, maximum acceleration is obtained, and a shock that is experienced at a time when the front wheel contacts a road surface from the wheelie state is alleviated by slowly lowering the front wheel. However, in the controller by the above conventional technique, which simply reduces the engine output torque, there is a case where the engine output torque is excessively reduced, which reduces the acceleration for more than necessary and/or increases the shock during contact of the front wheel with the ground.

The invention has a purpose of solving the problem pertaining to the above-described conventional technique and therefore provides a wheelie controller and a control method thereof capable of preventing a reduction of acceleration that is more than necessary and reducing a shock during contact of a front wheel with the ground when a wheelie state is terminated.

Solution to Problem

The invention is a wheelie controller for controlling a wheelie of a vehicle body and is characterized by including the steps of: computing a target trajectory, which is a target of a parameter and is used to control a wheelie state of the vehicle body, in accordance with the parameter that is related to pitch of the vehicle body; and controlling an increase/reduction of the pitch of the vehicle body so as to bring the parameter close to the target trajectory.

In this case, the parameter may include a pitch angle. The parameter may include a pitch angular speed. The parameter may include pitch angular acceleration. The parameters may include the pitch angle and the pitch angular speed, and the target trajectories may include a target pitch angle and a target pitch angular speed that is obtained by differentiating the target pitch angle. The parameters may include the pitch angular speed and the pitch angular acceleration, and the target trajectories may include the target pitch angular speed and target pitch angular acceleration that is obtained by differentiating the target pitch angular speed. The wheelie controller characterized in that the parameters may include the pitch angle and the pitch angular acceleration, and that the target trajectories may include the target pitch angle and the target pitch angular acceleration that is obtained by differentiating the target pitch angule. The pitch may be increased/reduced by increasing/reducing output of a motor. The pitch may be increased/reduced by increasing/reducing a braking force of a brake. When the vehicle body is operated to initiate the wheelie from a non-wheelie state, a target output value of the motor that is used to cause the wheelie of the vehicle body may be computed, and the output of the motor may be increased/reduced so as to be brought close to the target output value. It may be determined whether the wheelie of the vehicle body occurs. If it is determined that the wheelie of the vehicle body does not occur, first control for controlling the output of the motor may be executed to initiate the wheelie of the vehicle body. If it is determined that the wheelie of the vehicle body occurs, second control for increasing/reducing the pitch of the vehicle body may be executed to maintain the wheelie of the vehicle body. In the first control, an increase rate of the torque of the motor for initiating the wheelie of the vehicle body may be computed, and the target output value, with which the increase rate of the torque is obtained, may be computed.

In addition, the invention is a control method of a wheelie controller for controlling a wheelie of a vehicle body and is characterized by including the steps of: computing a target trajectory, which is a target of a parameter and is used to control a wheelie state of the vehicle body, in accordance with the parameter that is related to pitch of the vehicle body; and controlling an increase/reduction of the pitch of the vehicle body so as to bring the parameter close to the target trajectory.

In this case, the parameter may include a pitch angle. The parameter may include a pitch angular speed. The parameter may include pitch angular acceleration. The parameters may include the pitch angle and the pitch angular speed, and the target trajectories may include a target pitch angle and a target pitch angular speed that is obtained by differentiating the target pitch angle. The parameters may include the pitch angular speed and the pitch angular acceleration, and the target trajectories may include the target pitch angular speed and target pitch angular acceleration that is obtained by differentiating the target pitch angular speed. The wheelie controller characterized in that the parameters may include the pitch angle and the pitch angular acceleration, and that the target trajectories may include the target pitch angle and the target pitch angular acceleration that is obtained by differentiating the target pitch angule. The pitch may be increased/reduced by increasing/reducing output of a motor. The pitch may be increased/reduced by increasing/reducing a braking force of a brake. When the vehicle body is operated to initiate the wheelie from a non-wheelie state, a target output value of the motor that is used to cause the wheelie of the vehicle body may be computed, and the output of the motor may be increased/reduced so as to be brought close to the target output value. It may be determined whether the wheelie of the vehicle body occurs. If it is determined that the wheelie of the vehicle body does not occur, first control for controlling the output of the motor may be executed to initiate the wheelie of the vehicle body. If it is determined that the wheelie of the vehicle body occurs, second control for increasing/reducing the pitch of the vehicle body may be executed to maintain the wheelie of the vehicle body. In the first control, an increase rate of the torque of the motor for initiating the wheelie of the vehicle body may be computed, and the target output value, with which the increase rate of the torque is obtained, may be computed.

Advantageous Effects of the Invention

The invention can realize the wheelie controller and the control method thereof capable of preventing a reduction of acceleration that is more than necessary and reducing a shock during a contact of a front wheel with the ground when the wheelie state is terminated.

BRIEF DESCRIPTION OF DRAWINGS

FIG. 1 is a block diagram of an engine control system according to one embodiment, the engine control system including an ECU.

FIG. 2 includes graphs, each of which illustrates a state where the ECU controls pitch of a vehicle body on the basis of a target trajectory.

FIG. 3 includes graphs, each of which illustrates a state of control at a time when a wheelie of the vehicle body occurs.

FIG. 4 is a flowchart of wheelie control by the ECU.

DETAILED DESCRIPTION

A description will hereinafter be made on a preferred embodiment of the invention with reference to the drawings.

FIG. 1 is a block diagram of an engine control system according to this embodiment, the engine control system including an ECU.

An engine control system 100 according to this embodiment is mounted in a vehicle body of a motorcycle and includes an ECU (a wheelie controller) 10, an engine (a motor) 20, a sensor 30, and a memory 40.

The engine 20 is electrically connected to the ECU 10 and generates drive power to a rear wheel of the motorcycle on the basis of an instruction of the ECU 10.

The sensor 30 is a 5-D sensor that functions as a three-directional acceleration sensor in an x-direction, a y-direction, and a z-direction and also functions as two angular acceleration sensors around an x-axis and a y-axis. This sensor 30 is electrically connected to the ECU 10 and is provided to output a signal A1 that corresponds to detected acceleration and a signal A2 that corresponds to detected angular acceleration to the ECU 10.

The ECU 10 is electrically connected to the engine 20, the sensor 30, and the memory 40. This ECU 10 computes pitch angular acceleration of the vehicle body on the basis of the signals A1, A2 that are received from the sensor 30, and, on the basis of the computed pitch angular acceleration, generates pitch angle information indicative of a pitch angle of the vehicle body and pitch angular speed information indicative of a pitch angular speed of the vehicle body. Here, the pitch angle is an angle of the vehicle body with respect to a road surface. The pitch angle in a state where a front wheel and the rear wheel contact the road surface and the vehicle body stands still is set as 0 (zero) degree.

After a wheelie of the vehicle body occurs, the ECU 10 executes feedback control (second control) of engine output torque on the basis of a pitch response of the vehicle body. The ECU 10 is provided to integrate pitch-related parameters that include the pitch angle information and the pitch angular speed information of the vehicle body, so as to control a trajectory of the vehicle body in a pitching direction, that is, time transition of the pitch angle of the vehicle body. More specifically, the ECU 10 computes an ideal response of the pitch angle of the vehicle body as a target trajectory by referring to a map stored in the memory 40 and makes the actual pitch angle of the vehicle body follow and approach the computed target trajectory, so as to control an increase/reduction of the pitch of the vehicle body. The target trajectory includes a target pitch angle that corresponds to the pitch angle and a target pitch angular speed that corresponds to the pitch angular speed. The target pitch angle and the target pitch angular speed are set to have a differentiation/integration relationship with each other. That is, when the target pitch angle is differentiated, the target pitch angular speed is computed. By controlling the increase/reduction of the pitch of the vehicle body to bring it close to the target trajectory, the ECU 10 can determine a change in the pitch angle until the front wheel contacts the road surface in the case where the vehicle body is in a wheelie state. Note that the ECU 10 controls the increase/reduction of the pitch of the vehicle body to bring it close to the target trajectory by increasing/reducing the engine output torque.

In addition, the ECU 10 keeps the wheelie state of the vehicle body by setting the target trajectory such that the pitch angle is kept at a certain angle. More specifically, the ECU 10 executes control (first control) for causing the engine 20 to an engine output torque, which can promote smooth initiation of the wheelie, on the basis of vehicle body pitch information including the computed pitch angle and the computed pitch angular acceleration, engine output torque information, engine speed information, and gear information.

The memory 40 is a memory section and stores the map for computing the target trajectory by using the pitch-related parameters, such as the pitch angle information and the pitch angular speed information of the vehicle body. The ECU 10 refers to the map that is stored in the memory 40 and corresponds to the target trajectory, and obtains a signal A3 indicative of information on the target pitch angle and a signal A4 indicative of information on the target pitch angular speed.

FIG. 2 includes graphs, each of which illustrates a state where the ECU controls the pitch of the vehicle body on the basis of the target trajectory. In each of these graphs, a horizontal axis represents a lapse of time, and a range R1 represents a range of 1.0 second.

A line L0 (zero) indicates whether the ECU 10 intervenes in the pitch control of the vehicle body, and a vertical axis indicates that the ECU 10 intervenes in the pitch control when the line L0 is raised.

A line L1 represents a wheel speed of the front wheel, and a vertical axis represents a magnitude of the wheel speed. A line L2 represents a wheel speed of the rear wheel, and a vertical axis represents a magnitude of the wheel speed. A range R2 represents a range where the wheel speed is 100 km/h (kilometer per hour).

A line L3 represents the target pitch angle, and a vertical axis represents a magnitude of the pitch angle. A line L4 represents the actual pitch angle of the vehicle body, and a vertical axis represents a magnitude of the pitch angle. A range R3 represents a range where the pitch angle is 20 degrees.

A line L5 represents the target pitch angular speed, and a vertical axis represents a magnitude of the pitch angular speed. A line L6 represents the actual pitch angular speed of the vehicle body, and a vertical axis represents a magnitude of the pitch angular speed. A range R4 represents a range where the pitch angular speed is 1.0 radian per second. Note that the target pitch angle and the target pitch angular speed are set such that the target pitch angular speed represented by the line L5 is obtained when the target pitch angle represented by the line L3 is differentiated, that is, the target pitch angle represented by the line L3 is obtained when the target pitch angular speed represented by the line L5 is integrated.

A line L7 represents the actual torque output by the engine, and a vertical axis represents a magnitude of the torque. A line L8 represents requested torque that is requested by a rider through an accelerator operation, and a vertical axis represents a magnitude of the torque. A line L9 represents torque requested to the engine when the ECU 10 intervenes in the pitch control, and a vertical axis represents a magnitude of the torque. A range R5 represents a range where the magnitude of the torque is 100 N·m (newton-meter).

A description will hereinafter be made on a process of controlling the increase/reduction of the pitch of the vehicle body by increasing/reducing the engine output by the ECU 10.

First, an actual pitch angle PitchAngle_Actual of the vehicle body that is represented by the line L4 is obtained. Then, the ECU 10 computes a target pitch angular speed PitchRate_Target that is represented by the line L5 by using a map that represents a corresponding relationship between the actual pitch angle PitchAngle_Actual that is stored in the memory 40 and the target pitch angular speed PitchRate_Target.

Once computing the target pitch angular speed PitchRate_Target, the ECU 10 calculates $$e1 = PitcRate\_Target - PitchRate\_Actual$$

and computes a pitch angular speed difference e1 between the target pitch angular speed PitchRate_Target and an actual pitch angular speed PitchRate_Actual that is represented by the line L6.

Once computing the pitch angular speed difference e1, the ECU 10 multiplies the computed pitch angular speed difference e1 by a coefficient coefficient1 that is unique to the vehicle body or the engine and computes first requested torque RequestTorque1 that is requested to the engine 20 so as to obtain the target pitch angular speed.

Once computing the first requested torque RequestTorque1, the ECU 10 integrates the target pitch angular speed PitchRate_Target represented by the line L5 to compute a target pitch angle PitchAngle_Target that is represented by the line L3.

Once computing the target pitch angle PitchAngle_Target, the ECU 10 calculates $$e2 = PitcAngle\_Target - PitchAngle\_Actual$$

and computes a pitch angle difference e2 between the target pitch angle PitchAngle_Target and the actual pitch angle PitchAngle_Actual represented by the line L4.

Once computing the pitch angle difference e2, the ECU 10 multiplies the computed pitch angle difference e2 by a coefficient coefficient2 that is unique to the vehicle body or the engine and computes second requested torque RequestTorque2 that is requested to the engine 20 so as to obtain the target pitch angle.

Once computing the first requested torque RequestTorque1 and the second requested torque RequestTorque2, the ECU 10 calculates $$RequestTorque = RequestTorque1 + RequestTorque2$$

and computes requested torque RequestTorque that is represented by the line L9 and is actually requested to the engine 20. In this way, when the ECU 10 controls the engine 20 to make it output the requested torque RequestTorque, the pitch of the vehicle body is increased or reduced to approach the target trajectory, that is, the actual pitch angle represented by the line L4 approaches the target pitch angle represented by the line L3. In addition, the actual pitch angular speed represented by the line L6 approaches the target pitch angular speed represented by the line L5.

In this embodiment, the coefficients coefficient1, coefficient 2 are set such that, when the first requested torque RequestTorque1 and the second requested torque RequestTorque2 are added, the requested torque that is actually requested to the engine 20 is obtained. However, depending on how to set the coefficients coefficient1, coefficient 2, either one of the first requested torque RequestTorque1 and the second requested torque RequestTorque2 may only be set as the requested torque that is requested to the engine 20.

FIG. 3 includes graphs, each of which illustrates a state of control at a time when the wheelie of the vehicle body occurs. FIG. 3A is a graph that illustrates a relationship between the wheel speed and time, FIG. 3B is a graph that illustrates a relationship between the pitch angle and the time, and FIG. 3C is a graph that illustrates a relationship between the torque and the time. Note that a time axis corresponds to FIG. 3A to FIG. 3C.

In FIG. 3A a solid line LA1 represents the wheel speed of the front wheel, and a broken line LA2 represents the wheel speed of the rear wheel. As it is understood from this graph, the wheel speed of the rear wheel is increased at a constant gradient while the wheel speed of the front wheel is reduced at time t1 and is then rapidly increased at time t2. That is, the front wheel comes off the road surface by the wheelie at the time t1, and the wheel speed is thereby reduced. Then, the front wheel contacts the road surface again at the time t2, and the wheel speed is rapidly increased to become substantially the same wheel speed as that of the rear wheel. Note that a range R1 represents a range where the front wheel comes off the ground.

In FIG. 3B, a solid line LB1 represents the target pitch angle as a target at which the wheelie of the vehicle body smoothly occurs, and a broken line LB2 represents the actual pitch angle of the vehicle body.

In FIG. 3C, a solid line LC1 represents the output torque of the engine 20 that is requested by the rider through the accelerator operation, and a broken line LC2 represents the actual output torque by the engine 20. As it is understood from this graph, during the wheelie control, an increase/reduction of the output torque of the engine 20 is controlled by the ECU 10 regardless of the request of the rider.

In a range R2 from time at which the rider rapidly operates the accelerator for acceleration so as to perform the wheelie of the vehicle body to the time t1 at which the front wheel comes off the road surface, the ECU 10 controls the output torque of the engine 20 through the first control. Then, in a range R3 from the time t1 to time t3 at which the rider rapidly operates the accelerator for deceleration so as to terminate the wheelie, the ECU 10 controls the output torque of the engine 20 through the second control.

FIG. 4 is a flowchart of the wheelie control by the ECU. First, the ECU 10 determines whether the rider operates the accelerator for at least a specified operation amount, that is, whether the rider attempts to perform the wheelie of the vehicle body (step S1). Here, the specified operation amount of the accelerator means an operation amount that is at least equal to an operation amount of the accelerator capable of causing the wheelie of the vehicle body, and is stored in the memory of the ECU 10 in advance.

If it is determined in step S1 that the rider does not operate the accelerator for at least the specified operation amount (step S1: No), the ECU 10 does not intervene in the wheelie control or terminates the currently executing wheelie control (step S2) and repeats a series of processes from step S1.

On the other hand, if it is determined in step S1 that the rider operates the accelerator for at least the specified operation amount (step S1: Yes), the ECU 10 determines whether the wheelie of the vehicle body currently occurs on the basis of wheel speed signals that are obtained from the wheel speed sensors 20 for the front wheel and the rear wheel (step S3).

If it is determined in step S3 that the wheelie of the vehicle body does not occur (step S3: No), the ECU 10 computes the pitch angular speed, which is the angular speed of the vehicle body in the pitching direction, on the basis of the signal output from the 5-D sensor and computes the pitch angle and the pitch angular acceleration on the basis of the computed pitch angular speed. Next, the ECU 10 computes the gradient of the output torque of the engine 20 at which the wheelie is smoothly initiated, that is, an increase rate of the output torque on the basis of the vehicle body pitch information including the parameters of these pitch angle and pitch angular acceleration, the output torque information of the engine 20, the speed information of the engine 20, and the gear information (step S4).

After computing the increase rate of the output torque of the engine 20, at which the wheelie is smoothly initiated in step S4, the ECU 10 computes the target output value with which the computed increase rate of the output torque is obtained (step S5).

After computing the target output value in step S5, the ECU 10 increases/reduces the output torque of the engine 20 so as to bring it close to the computed target output value (step S6), and repeats the series of the processes from step S1.

On the other hand, if it is determined in step S3 that the wheelie of the vehicle body currently occurs (step S3: Yes), the ECU 10 compares the actual pitch angle of the vehicle body, which is computed on the basis of the signal output from the 5-D sensor, with the target trajectory as the target during the wheelie (step S7).

After comparing the actual pitch angle of the vehicle body with the target trajectory as the target during the wheelie in step S7, the ECU 10 computes the target output value that is used to reduce a difference between the actual pitch angle of the vehicle body and the target trajectory (step S8).

After computing the target output value in step S8, the ECU 10 increases/reduces the output torque of the engine 20 so as to bring it close to the computed target output value (step S6), and repeats the series of the processes from step S1.

Through the processes described so far, the ECU 10 can drive the engine 20 to cause the wheelie of the vehicle body at the time when the rider's operation of the accelerator does not cause the wheelie of the vehicle body (step S3: No). Meanwhile, the ECU 10 can also drive the engine 20 to maintain the wheelie at the time when the wheelie of the vehicle body occurs (step S3: Yes).

In this embodiment, in accordance with the parameters of the pitch angle and the pitch angular speed, which are associated with the pitch of the vehicle body, the ECU 10 computes the target trajectory that is used as the target of the parameters, so as to control the wheelie state of the vehicle body. Then, the ECU 10 controls the increase/reduction of the pitch of the vehicle body by increasing/reducing the output of the engine 20 and/or a braking force of a brake so as to bring the parameters close to the target trajectory. In this way, the pitch angle can slowly be reduced from the wheelie state. Thus, it is possible to prevent the reduction of the acceleration that is more than necessary and to reduce a shock during the contact of the front wheel with the ground during termination of the wheelie state.

In addition, the wheelie controller 10 can compute the target output value of the engine 20 for causing the wheelie of the vehicle body on the basis of the information corresponding to the pitch angle of the vehicle body and thereby increase/reduce the output torque of the engine 20 to bring it close to the target output value. In this way, the rider does not have to adjust the output torque of the engine 20 through the accelerator operation, and an operation to bring the vehicle body into the wheelie state can entirely be performed by electronic control. While the output torque of the engine 20 can be reduced at a time when the pitch angle of the vehicle body is too large, the output torque of the engine 20 can be increased at a time when the pitch angle of the vehicle body is too small. Thus, the rider can easily perform the wheelie of the vehicle body without relying on a maneuvering technique.

The invention has been described so far on the basis of the embodiment. However, the invention is not limited thereto. For example, in the above embodiment, only the pitch angle and the pitch angular speed are used as the parameters for controlling the increase/reduction of the pitch of the vehicle body. However, the parameters are not limited thereto. For example, as long as the increase/reduction of the pitch of the vehicle body can be controlled to bring it close to the target trajectory, the pitch angular acceleration may be used as the parameter. In addition, the target pitch angular acceleration, which is obtained by differentiating the target pitch angular speed, may be used for the target trajectory. In this way, the pitch of the vehicle body may be controlled with higher accuracy.

In addition, in the above embodiment, the target trajectory is used as the information on the pitch of the vehicle body. However, the invention is not limited thereto. For example, the pitch of the vehicle body may be controlled by setting a target trajectory of the requested torque that is requested to the engine.

Furthermore, in the above embodiment, the pitch is increased/reduced by increasing/reducing the engine output torque, so as to bring the pitch close to the target trajectory. However, the invention is not limited thereto. As long as the pitch of the vehicle body can be increased/reduced, means such as a gyro-mechanism that controls the engine speed, an engine fuel injection amount, an engine air amount, electric motor torque of a two-wheeled vehicle or the like driven by electricity, brake torque, and balance of the vehicle body or control of a damping force of a suspension, an engaged state of a clutch, a gear position, and a position of center of gravity of the vehicle body, may be used. In addition, the ECU may integrally control the engine output torque and a braking force of a rear-wheel brake. In a case of such a configuration, the number of disturbance elements is smaller than that in a case where the rider has to adjust either one of the engine output torque and the braking force of the rear-wheel brake. Thus, the engine output torque and the braking force of the rear-wheel brake can be well balanced.

Moreover, in the above embodiment, the target output value is directly computed from the pitch angle information of the vehicle body, which is computed from the signal received from the sensor 30. However, the invention is not limited thereto. For example, the target output value may be corrected by the wheel speed, wheel acceleration, a vehicle body speed, a vehicle body acceleration, the engine output torque, the engine speed, the gear information, front-wheel master cylinder-wheel caliper brake pressure, rear-wheel master cylinder-wheel caliper brake pressure, a brake pad temperature, or the like.

Moreover, in the above embodiment, the target output value is computed for each of the vehicle bodies in which the ECU is actually mounted. However, the invention is not limited thereto. For example, as long as the wheelie of the vehicle body can be controlled, the target output value may be estimated by using a standardized vehicle body model.

The invention claimed is:

1. A wheelie controller for controlling a wheelie of a vehicle, the wheelie controller configured to:
   compute a target output value of a motor of the vehicle so as to cause the wheelie of the vehicle;
   control a torque output of the motor so as to bring it close to the target output value to initiate the wheelie from a non-wheelie state;
   compute a target trajectory, which is a target of a parameter and to control a wheelie state of the vehicle, in accordance with the parameter that is related to a pitch of the vehicle;
   and
   continue to control, from a time at which the wheelie is initiated such that a front wheel of the vehicle comes off a road surface to a time at which a rider operates an accelerator of the vehicle for deceleration, an increase/reduction of the pitch of the vehicle so as to bring the parameter close to the target trajectory and to maintain the wheelie state.

2. The wheelie controller according to claim 1 characterized in that the parameter includes a pitch angle.

3. The wheelie controller according to claim 1 characterized in that the parameter includes a pitch angular speed.

4. The wheelie controller according to claim 1 characterized in that the parameter includes a pitch angular acceleration.

5. The wheelie controller according to claim 1 characterized in that the parameter includes a pitch angle and a pitch angular speed, and the target trajectory includes a target pitch angle and a target pitch angular speed that is obtained by differentiating the target pitch angle.

6. The wheelie controller according to claim 1 characterized in that the parameters include a pitch angular speed and a pitch angular acceleration, and the target trajectory includes a target pitch angular speed and a target pitch angular acceleration that is obtained by differentiating the target pitch angular speed.

7. The wheelie controller according to claim 1 characterized in that the parameters include the pitch angle and the pitch angular acceleration, and the target trajectories include the target pitch angle and the target pitch angular acceleration that is obtained by differentiating the target pitch angle.

8. The wheelie controller according to claim 1 characterized in that the pitch is increased/reduced by increasing/reducing the torque output of the motor.

9. The wheelie controller according to claim 1 characterized in that the pitch is increased/reduced by increasing/reducing a braking force of a brake.

10. The wheelie controller according to claim 1 characterized in that, when the vehicle is operated to initiate the wheelie from the non-wheelie state, an increase rate of torque of the motor for initiating the wheelie of the vehicle is computed, and the target output value, with which the increase rate of the torque is obtained, is computed.

11. A control method of a wheelie controller for controlling a wheelie of a vehicle, the method comprising:
    computing a target output value of a motor of the vehicle so as to cause the wheelie of the vehicle;
    control a torque output of the motor so as to bring it close to the target output value to initiate the wheelie from a non-wheelie state;
    computing a target trajectory, which is a target of a parameter and control a wheelie state of the vehicle, in accordance with the parameter that is related to pitch of the vehicle;
    and
    continuing to control, from a time at which the wheelie is initiated such that a front wheel comes off a road surface to a time at which a rider operates an accelerator of the vehicle for deceleration, an increase/reduction of the pitch of the vehicle so as to bring the parameter close to the target trajectory and to maintain the wheelie.

12. The control method of the wheelie controller according to claim 11 characterized in that the parameter includes a pitch angle.

13. The control method of the wheelie controller according to claim 11 characterized in that the parameter includes a pitch angular speed.

14. The control method of the wheelie controller according to claim 11 characterized in that the parameter includes a pitch angular acceleration.

15. The control method of the wheelie controller according to claim 11 characterized in that the parameter includes a pitch angle and a pitch angular speed, and the target trajectory includes a target pitch angle and a target pitch angular speed that is obtained by differentiating the target pitch angle.

16. The control method of the wheelie controller according to claim 11 characterized in that the parameter includes a pitch angular speed and a pitch angular acceleration, and the target trajectory includes a target pitch angular speed and a target pitch angular acceleration that is obtained by differentiating the target pitch angular speed.

17. The control method of the wheelie controller according to claim 11 characterized in that the parameter includes a pitch angle and a pitch angular acceleration, and the target trajectory includes a target pitch angle and a target pitch angular acceleration that is obtained by differentiating the target pitch angle.

18. The control method of the wheelie controller according to claim 11 characterized in that the pitch is increased/reduced by increasing/reducing the torque output of a motor.

19. The control method of the wheelie controller according to claim 11 characterized in that the pitch is increased/reduced by increasing/reducing a braking force of a brake.

20. The control method of the wheelie controller according to claim 11 characterized in that when the vehicle is operated to initiate the wheelie from the non-wheelie state, an increase rate of torque of the motor for initiating the wheelie of the vehicle is computed, and the target output value, with which the increase rate of the torque is obtained, is computed.

* * * * *